(12) United States Patent
Ankaiah et al.

(10) Patent No.: US 8,380,819 B2
(45) Date of Patent: Feb. 19, 2013

(54) METHOD TO ALLOW SEAMLESS CONNECTIVITY FOR WIRELESS DEVICES IN DHCP SNOOPING/DYNAMIC ARP INSPECTION/IP SOURCE GUARD ENABLED UNIFIED NETWORK

(75) Inventors: Shashi H. Ankaiah, Kallahalli Mandya (IN); Seemant Choudhary, Fremont, CA (US); Udaya N. Shankar, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 218 days.

(21) Appl. No.: 12/778,573

(22) Filed: May 12, 2010

(65) Prior Publication Data

US 2010/0293250 A1 Nov. 18, 2010

Related U.S. Application Data

(60) Provisional application No. 61/178,281, filed on May 14, 2009.

(51) Int. Cl.
*G06F 15/16* (2006.01)
(52) U.S. Cl. ......... 709/219; 709/217; 709/224; 709/225
(58) Field of Classification Search .................. 709/219, 709/217, 224, 225
See application file for complete search history.

(56) References Cited

U.S. PATENT DOCUMENTS

| | | | | |
|---|---|---|---|---|
| 6,473,411 B1 * | 10/2002 | Kumaki et al. | ............... | 370/331 |
| 7,596,614 B2 * | 9/2009 | Saunderson et al. | .......... | 709/224 |
| 7,653,063 B2 * | 1/2010 | Ertemalp | ...................... | 370/392 |
| 8,104,072 B2 * | 1/2012 | Rohilla et al. | .................... | 726/4 |
| 2008/0165778 A1* | 7/2008 | Ertemalp | ...................... | 370/392 |
| 2009/0300178 A1* | 12/2009 | Saunderson et al. | .......... | 709/224 |

* cited by examiner

*Primary Examiner* — Asghar Bilgrami
(74) *Attorney, Agent, or Firm* — Anderson Gorecki & Rouille LLP

(57) ABSTRACT

Techniques disclosed herein include systems and methods for providing a mechanism to enable smooth, seamless, and reliable connectivity for wireless devices in a unified network, such as networks that apply a given security policy to both wired and wireless devices. The system supports roaming of mobile units across mobility switches. A given mobile unit can retain its IP address in both intra-subnet and inter-subnet roaming scenarios. The given mobile unit also retains its membership to a mobility VLAN to which the mobile unit had been assigned, even during roaming scenarios. The system moves or propagates IP address to MAC address bindings from one network to another network within a mobility domain. As soon as a mobile user roams to another network, authentication information is readily available to enable immediate connection to the new network to begin sending and receiving data traffic. The mobile unit can be using either static IP addressing, or can dynamically acquire IP addresses through DHCP.

17 Claims, 8 Drawing Sheets

FIG. 3  TO STEP 250 IN FIGURE 4

METHOD TO ALLOW SEAMLESS CONNECTIVITY FOR WIRELESS DEVICES IN DHCP SNOOPING/DYNAMIC ARP INSPECTION/IP SOURCE GUARD ENABLED UNIFIED NETWORK

CROSS REFERENCE TO RELATED APPLICATIONS

The present application claims the benefit of U.S. Provisional Patent Application No. 61/178,281 filed on May 14, 2009, entitled "Method To Allow Seamless Connectivity For Wireless Devices In DHCP Snooping/Dynamic ARP Inspection/IP Source Guard Enabled Unified Network", which is incorporated herein by reference in its entirety.

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices. Certain computer networks can provide an environment in which both wired and wireless users are supported by a same set of network switches by applying a same set of policies. Such an environment can be described as a unified network.

Computer networks can include various configurations. One such configuration, known as a local area network (LAN), provides network connectivity to a group of client computers using a single broadcast domain. In a broadcast domain, layer 2 broadcasts from one node can reach all other nodes in the domain. This group is typically small relative to other networks, and is often limited to a specific geographical area or network switch. A network switch can segment a physical LAN into multiple virtual broadcast domains or VLAN(s). The IEEE 802.1Q standard describes the concept of VLAN in detail. The virtual segmentation of communication on a same physical LAN is achieved using a VLAN specific ID tag to the layer 2 frames. The physical ports on the network switches can be configured to be members of one or more VLAN(s). A network switch forwards broadcast traffic for a VLAN only on those ports that are members of the VLAN.

A network switch can also apply policies on all traffic that flows in a VLAN. For example, the network switch can have VLAN-based access control lists to prevent users that belong to a certain VLAN from access certain networked resources. The static configuration approach in a wired network functions because wired end devices are always attached to the network via a single access port. A wireless local area network (WLAN), however, allows computing devices to move around. In this wireless scenario, the access port of a wireless device, from the point of view of a network switch, can change dynamically. Even though the access port of a wireless user can change dynamically, the VLAN and the network policies applied for the wireless client can remain independent of the port of access.

SUMMARY

A wireless mobility domain can span across multiple L3 (layer 3) networks within an enterprise network. Certain mobility domains can consists of thousands of access points, hundreds of mobility switches, and dozens of wireless controllers. The wireless controllers configure the access points and mobility switches and monitor and manage the wireless network. Data traffic from the wireless clients is typically tunneled to mobility switches via pre-established access tunnels between access points and mobility switches. Typically, an access point establishes access tunnels with one mobility switch in the mobility domain. This mobility switch provides a switching point for traffic between wireless clients and between wireless and wired clients in the enterprise network. As such, mobility switches can send traffic from a wireless client out of a physical port into a wired domain, send a wireless client traffic to another mobility switch over a tunnel called a mobility tunnel, or send traffic from a physical port over to a wireless client on access tunnel or mobility tunnel. An MS uses standard layer 2 switching technology for switching traffic between wireless domain and wired domain.

A mobility switch can extend the concept of VLAN from the wired domain to the entire mobility domain. Wireless users can be assigned to mobility VLANs that are identified by a unique name within the entire mobility domain. A few mobility switches in the mobility domain can map the mobility VLAN to a wired VLAN to which they have access on their physical ports. A mobility switch that maps a mobility VLAN to a wired VLAN is said to provide "service" for that mobility VLAN. A mobility switch that advertises its service to peer mobility switches in the mobility domain is said to be a server for that mobility VLAN. A mobility switch that does not provide service for a mobility VLAN can become a client for the mobility VLAN when a wireless user belonging to the mobility VLAN roams to an access point with which the client mobility switch has an access tunnel. A mobility switch thus unifies a wired VLAN with a mobility VLAN.

Unification of VLANs, however, should accompany with unification of policies that get applied to all devices (wireless or wired) on that VLAN. For example, a given unified network can have a same set of security policies to apply to both wired and wireless users. Such security policies can be designed for wired devices, and so applying these security features to wireless devices is challenging, especially when wireless devices roam within the mobility network such as roaming to a different access point, mobility switch, subnet, or VLAN. There are several security features that a unified network can enable, including conventional security features such as DHCP Snooping, Dynamic ARP Inspection, and IP Source Guard.

Dynamic Host Configuration Protocol (DHCP) Snooping is a conventional security feature that provides network security by filtering un-trusted DHCP messages. An un-trusted message is a message that is received from an un-trusted port, and that can cause traffic attacks within the network. DHCP snooping is centered on the concept of trusted and un-trusted switch ports. Trusted ports are usually connected to a core of the network and are configured to receive messages from within the network. A network switch port that connects to a DHCP server is a trusted port. Un-trusted ports can be either access links or ports connected to the core of the network. Un-trusted ports can receive messages from outside the network or firewall.

DHCP can include two components: a protocol for delivering host specific configuration parameters from a DHCP server to a host, and a mechanism for allocation of network addresses to hosts. DHCP is built on a client-server model, where designated DHCP servers allocate network addresses and deliver configuration parameters to dynamically configured hosts.

DHCP snooping maintains a binding table, which contains MAC address, IP address, lease time, binding type, VLAN, and port information that correspond to un-trusted ports on the switch. The switch drops a DHCP packet when various conditions are met. Thus, a DHCP Snooping feature provides network protection from rogue DHCP servers by creating a logical firewall between un-trusted hosts and DHCP servers. For incoming packets received on un-trusted ports, packets are dropped if the source MAC address does not match a MAC address in a binding table entry.

Dynamic ARP (Address Resolution Protocol) Inspection (DAI) is a security feature that restricts IP traffic on switch ports by filtering traffic based on a DHCP binding table and an IP source binding table. Restriction of IP traffic by DAI prevents man-in-the-middle attacks. A DHCP binding table, which gives IP address to MAC address bindings, is built by monitoring DHCP requests and reply messages. IP source binding tables are manually configured. Manually configured entries are required to support clients where IP address configuration is static. Together, they are referred to as address binding tables. DAI uses the IP to MAC binding table to snoop or inspect ARP messages from client devices. DAI typically functions with DHCP Snooping enabled on an interface.

IP (Internet Protocol) Source Guard provides security to a network by filtering clients with invalid IP addresses. IP Source Guard is an L2 (layer 2, data link layer), per-port feature that works closely with the information in the DHCP snooping and static binding table. Static entries are configured in the binding table to support clients where IP addresses are statically configured. IP source guard typically functions with DHCP Snooping enabled. When IP Source Guard is enabled on an un-trusted port, an IP filter entry is created based on the IP information stored in the corresponding binding table entry. If a source IP is in the binding table, then the traffic will be allowed from a given client. If the source IP address is not in the binding table then traffic will be dropped from that client.

With a wired network having wired nodes or client devices, deploying such features is relatively straightforward because such features can be configured on one network switch that has wired users that do not move out of that switch. In a unified network, however, a given wireless user can roam all over a network including changing subnets and creating other challenges. Authentication is one challenge. Another challenge is maintaining an IP address of a mobile user even when the mobile user roams to a different subnet, VLAN, or other physical or logical division within the mobility domain. Another challenge is providing the same security features, which benefit a wired user, to a wireless user roaming across or around the network.

Enforcing security features equivalently for both wired and wireless users is a challenge because the security features must be available wherever a wireless device roams, and roaming latency should not be impacted. Another challenge is protecting wireless devices from malicious wired users. In traditional wired networking, a host computer (client device) will not move within a network. The host computer is usually static, that is, positioned in one location with no movement of the host computer. With a wireless domain, however, roaming is common among mobile units (wireless client devices). One attempted solution is configuring a binding entry manually. This approach is not convenient for mobile users and is very tedious because this requires a network administrator to intervene and manually configure binding table entries on all mobility switches and access points.

Techniques disclosed herein include systems and methods for providing a mechanism to enable smooth, seamless, and reliable connectivity for wireless devices in a unified network. The system supports intra-subnet and inter-subnet roaming of mobile units. A given mobile unit can retain its IP address in both intra-subnet and inter-subnet roaming scenarios. The given mobile unit also retains its membership to the mobility VLAN to which it had been assigned, even during roaming scenarios. The system moves or propagates IP address to MAC address bindings wherever a mobile unit roams within a mobility domain. As soon as a mobile user roams to another network, authentication information is readily available to enable immediate connection to the new network to begin sending and receiving data traffic. The mobile unit can use either static IP addresses, or can dynamically acquire IP addresses through DHCP.

In one embodiment, a first wireless controller establishes a control channel between a second wireless controller. Wireless controllers can operate as part of mobility switches or separate from mobility switches. The first wireless controller manages the first mobility switch and a second wireless controller manages a second mobility switch within a mobility domain. The first access point establishes an access tunnel with the first mobility switch and establishes a control channel with the first wireless controller. The second access point establishes an access tunnel with the second mobility switch and establishes control channel with the second wireless controller. The mobility domain provides wireless network connectivity for mobile units, and wired network connectivity for static client devices. The control channel provides a connection for control messaging between the first mobility switch and the second mobility switch or between the first wireless controller and the second wireless controller. The first mobility switch and the second mobility switch establish a data tunnel called a mobility tunnel between each other. The first mobility switch and the second mobility switch are network switches that process data traffic from one or more mobile units, and from one or more static client devices within the mobility domain. The first mobility switch provides connectivity for a first virtual local area network, and the second mobility switch provides connectivity for a second virtual local area network. The first mobility switch configures policies such as DHCP Snooping, DAI and IP Source Guard on the local VLAN, which provides connectivity to the first mobility VLAN.

The wireless controller, mobility switch, or other device within the mobility domain executes a security policy that controls data traffic in that the security policy selectively enables certain or authorized client computers to transmit data traffic within the mobility domain. This security policy is based on IP (Internet Protocol) addresses of client devices attempting to connect to the mobility domain. The security policy can be executed for both the first virtual local area network and for the second virtual local area network. Alternatively, the security policy can be executed for a first and second division of the mobility domain, which division can be either physical or virtual. For example, the division can be based on a physical location of mobility switches, or can be based on groups of client devices without respect to physical location of mobility switches and client devices. Also, the security policy can be applied equally to both static computing devices and to mobile units.

The wireless controller (or first wireless controller) receives an authentication request for a first mobile unit to connect to the mobility domain via the first mobility switch, which first mobility switch in turn can receive the authentication request from a first access point. The first wireless controller relays the authentication request from the first mobile unit to the remote authentication server. The first wireless controller will relay the response from remote authentication server to the first access point. The first access point snoops the response from the remote authentication server to get the mobility VLAN assigned to the VLAN and to optionally retrieve IP to MAC address binding (for mobile units where IP address configuration is static. The first access point requests the first mobility switch to include the access tunnel in the mobility VLAN. The first mobility switch conveys policies configured on the local VLAN that is providing connectivity for the mobility VLAN in a return response to the first access point. The first access point adds an entry to the first binding table. The first access point installs access control rules to allow data from the mobile unit. This first binding table maintains an association of source IP address to Media Access Control (MAC) address of client devices, the MAC address being a physical device address or other unique physical device identifier. In other words, a given IP address is bound or tied to a specific MAC address or other unique device identifier. The access control list entry indicates that the first mobile unit is authenticated for transmitting data traffic within the mobility domain via the first mobility switch (via the first access point). The first access point passes binding information to the first wireless controller. The wireless controller transmits the access control list entry to the second wireless controller table via the control channel previously established between the two wireless controllers. The second binding table is associated with the second mobility switch. The access control list entry in the second binding table indicates that the first mobile unit is authenticated for transmitting data traffic within the mobility domain via the second mobility switch and accompanying hardware, such as the second access point device.

Note that the wireless controller can distinguish between control traffic and data traffic. The mobility domain is generally enabled to receive and analyze control traffic from a given client device for authentication purposes, but that client device typically needs to be authenticated before being able to send and receive data traffic or other similar content.

In other embodiments, the wireless controller or first access point establishes a first access tunnel between the first mobility switch and a first access point device. The first access point device has a network connection to the first mobility switch. The first access point device provides wireless network connectivity to one or more mobile units. The wireless controller or second access point also establishes a second access tunnel between the second mobility switch and a second access point device. The second access point device has a network connection to the second mobility switch. The second access point device provides wireless network connectivity to one or more mobile units within the mobility domain.

The wireless controller or administrator configures an IP address to MAC binding in a remote authentication server for the first mobile unit. The remote authentication server is separate from the first wireless controller or first mobility switch and the second wireless controller or second mobility switch. In this embodiment, receiving the authentication request for the first mobile unit to connect to the mobility domain via the first wireless controller or mobility switch includes transmitting the authentication request from the first access point device to the remote authentication server in response to the first mobile unit attempting to connect to the mobility domain at the first access point device. In other words, the wireless controller operates in conjunction with, or as components of, access point devices and mobility switches.

The first access point or wireless controller receives an authentication response, from the remote authentication server, via the first wireless controller at the first access point device. This authentication response includes the IP address to MAC address binding for the first mobile unit, as assigned or otherwise configured by the authentication server. The wireless controller or access point device builds an IP address to MAC address binding table at the first access point device. The system then transmits IP address to MAC address binding entries from the first access point device to the first wireless controller or first mobility switch, and from the first wireless controller or first mobility switch to the second wireless controller or mobility switch. Binding information can be conveyed to the second access point when a mobile unit roams from first access point to the second access point.

In another embodiment, the first wireless controller receives the authentication request for a first mobile unit to connect to the mobility domain via the first mobility switch includes receiving the authentication request at the first access point device. Underlying security policies can be unified through management protocols over access tunnels. The first wireless controller conveys the response from the remote authentication server to the first access point. The first access point inspects DHCP packets from the mobile unit to identify an IP address to MAC address binding for the first mobile unit. The first access point builds an IP address to MAC address binding table. The first Access Point passes the binding entry to the first wireless controller. In this embodiment, when the first wireless controller transmits the access control list entry to the second wireless controller via the control channel.

The first mobile unit roams to the second access point, which is connected to the second wireless controller and the second mobility switch. The second wireless controller passes the cached information of the first mobile unit to the second access point. The cached information includes the binding information for the mobile unit. The second access point installs access control rule for the entries in the received binding table. With a copy of binding table entries copied or moved to other wireless controllers or mobility switches and/or access points within the domain, a time required for authentication of a roamed user to a given VLAN, access point, or other division of the mobility domain in general, is an authentication time that is significantly shorter than conventional techniques, thereby providing for quick authentication and seamless transition between or among access points, mobility switches and VLANs within the mobility domain.

Yet other embodiments herein include software programs to perform the steps and operations summarized above and disclosed in detail below. One such embodiment comprises a computer program product that has a computer-storage medium (e.g., a non-transitory tangible computer readable storage media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: establishing a control channel between a first mobility switch and a second mobility switch within a mobility domain, the mobility domain providing wireless network connectivity for mobile units and wired network connectivity for static client devices, the control channel providing a connection for control messaging between the first mobility switch and the second mobility switch, the first mobility switch and the second mobility switch being network switches that process data traffic from one or more mobile units and from one or more static client devices, the first mobility switch providing connectivity for a first virtual local area network, the second mobility switch providing connectivity for a second virtual local area network; executing a security policy that controls data traffic based at least on IP (Internet Protocol) addresses of client devices attempting to connect to the mobility domain, the security policy being executed for both the first virtual local area network and for the second virtual local area network, the security policy being applied equally to both static computing devices and to mobile units; receiving an authentication request for a first mobile unit to connect to the mobility domain via the first mobility switch; adding an access control list entry to a first binding table, the first binding table being associated with the first mobility switch, the first binding table maintaining an association of source IP address to Media Access Control (MAC) address of client devices, the access control list entry indicating that the first mobile unit is authenticated for transmitting data traffic within the mobility domain via the first mobility switch; and transmitting the access control list entry to a second binding table via the control channel, the second binding table being associated with the second mobility switch, the access control list entry in the second binding table indicating that the first mobile unit is authenticated for transmitting data traffic within the mobility domain via the second mobility switch. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting mobility of wireless devices across network switches. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for providing a mechanism to enable smooth, seamless, and reliable connectivity for wireless devices roaming within a unified network that can enable IP Source Guard, DHCP Snooping, Dynamic ARP Inspection (DAI), and/or other security features. The system supports roaming of mobile units across mobility switches. A given mobile unit can retain its IP address in both intra-subnet and inter-subnet roaming scenarios.

The mobility domain includes mobility switches that form a wireless control plane and data plane. The mobility domain can be a unified network that includes unified network switches, access point devices, Remote Authentication Dial In User Service (RADIUS) servers, and DHCP servers. A network switch is unified in that the switch handles traffic from both wireless and wired clients, and can apply a same security policy or set of policies to both types of client devices. Mobility switches (unified switches) can establish connections with peer mobility switches. DHCP Snooping, DAI, and IP Source Guard can be a global configuration within the unified network.

Certain unified networks can apply identical policies to devices that connect to the same part of the network. In one embodiment, such policies could be the same across networks, or a specific policy could be the same across a single network. These policies can arise from a single network switch configuration. The unified network could be emulated in terms of user experience, or it could be ingrained in the network. For example, a given mobility domain is designed so that a wireless user has the same policies as a wired user. A given network can deploy separate policies, but this can introduce complication, expense, and reduce security. Having identical policies enables similar or identical experiences for both wireless and wired users. In embodiments where traffic from both wired and wireless users goes through a same network switch, then typically such network switches are designed to apply identical security policies regardless of a type of client device using that network switch.

Figure 1:
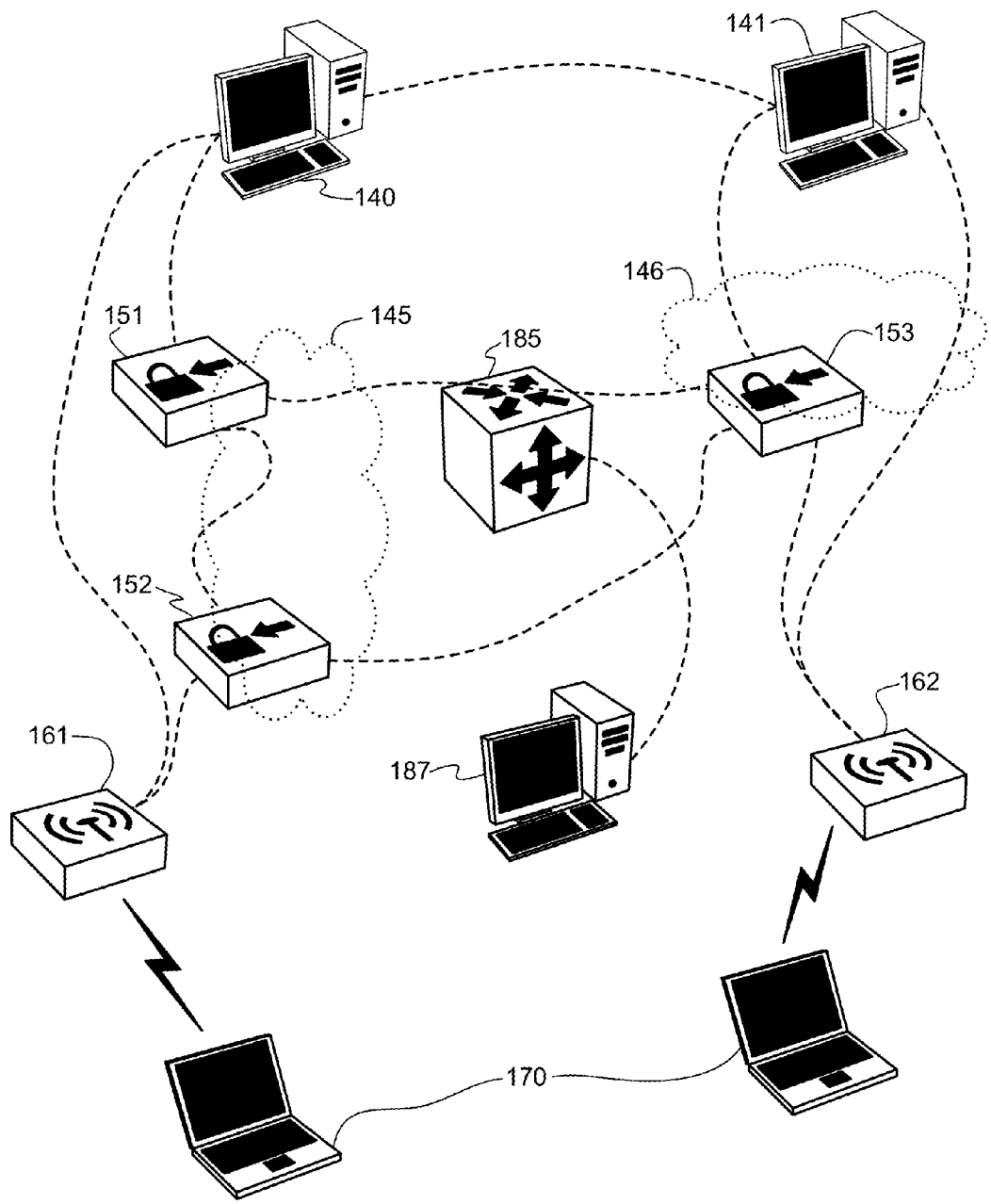
FIG. 1 is diagram of a portion of a unified network according to embodiments herein.

FIG. 1 illustrates a portion of an example wireless network system or mobility domain operating as a unified network. The wireless controller 140 and wireless controller 141 function as wireless control planes running as a virtual appliance. Wireless controller 140 can function as a software component of mobility switch 151 and/or mobility switch 152, while wireless controller 141 functions as a component of mobility switch 153. Wireless controllers can also operate as components located in access point devices 161 and 162. In other words, wireless controllers can manage mobility switches and access points. Each mobility switch can connect with other peer mobility switches within the mobility domain. The mobility domain can include one or more network divisions, which network divisions can be logical and/or physical divisions. In this example, mobility switches 151 and 152 are part of VLAN 145, while mobility switch 153 is part of VLAN 146. Mobility switches can connect with Layer 3 network switch 185, or other router, which in turn can connect to authentication server 187, such as a RADIUS server. Mobile unit 170 is a wireless client device that can roam within the mobility domain, such as from access point device 161 to access point device 162.

The mobile unit 170 can be using static IP addresses, or can dynamically acquire IP addresses through DHCP. The system can adjust process steps according to whether mobile unit 170 uses a static or dynamic IP address.

For static IP address configuration, an administrator, wireless controller 140, or other entity defines a source IP address to MAC address binding on the authentication server 187, which authentication server is accessible from the mobility domain. When a mobility switch or access point is added to the mobility domain, the switches and access points establish a connection with the control plane by registering with a wireless controller. After registration, wireless controllers can begin managing network connectivity. Wireless controller 140 can also establish connections with peer wireless controllers and establish a cluster. Note that authentication server can be a remote server accessible via the mobility domain, or, in one alternative, each wireless controller can act as an authentication server and maintain a table at the wireless controller.

When mobile unit 170 attaches to access point 161, it first sends an authentication request. Access point 161 collects the authentication request from the mobile unit 170, which is routed to authentication server 187 via the control plane. The authentication server 187 sends an authentication response. Access point 161 will snoop or inspect the authentication response, which can include an IP address to MAC address binding. Access point 161 conveys the authentication response to mobile unit 170. Access point 170 then installs an access control list for the source IP to pass traffic from the source IP. Installation of access control lists during authentication can be enforced by a given security policy. Mobile unit 170 can then begin sending and receiving data traffic. Wireless controller 140 can prevent mobile unit 170 from sending data traffic until access point 161 installs a corresponding access control list entry.

Before authorization to send data traffic, the mobile unit 170 can be restricted to sending control traffic. IP address to MAC address binding information discovered at access point 161 can be conveyed to the wireless controller 140 or the control plane. Thus, wireless controller 140 can receive this IP to MAC address binding, and can distribute this IP to MAC address binding to peer wireless controllers or wireless control planes in the mobility domain. Similarly, peer wireless controllers can propagate binding information from other mobile units to wireless controller 140. In this non-limiting example, the access point 161 inspects a response from authentication server 187. Alternatively, wireless controller 140 can inspect or snoop the response from authentication server 187, and then sync bindings with peer wireless controllers.

By advertising or publishing IP to MAC address bindings, each wireless controller within a given mobility domain can store this information locally. For example, mobile unit 170 roams from VLAN 145 to VLAN 146 by detaching from access point device 161 and attaching to access point device 162. In response to mobile unit 170 attempting to attach to access point 162, wireless controller 141 sends binding information, or other security policy information, to access point 162. Receiving such security policy information, access point 162 can immediately install corresponding access control lists to be enabled to pass data traffic from mobile unit 170. This technique prevents mobile unit 170 from losing significant traffic, even when roaming from one network to another network within the mobility domain. Having such security information, or authentication parameters, cached by peer wireless controllers means that the mobile unit 170 does not need to reinitiate authentication with the authentication server. This enables fast roaming of mobile units.

As disclosed, the mobile unit 170 can be using static IP addressing, or can dynamically acquire an IP address through DHCP. For dynamic IP addresses, admin intervention at the authentication sever is not required. Dynamic IP addressing can use the DHCP snooping feature. With DHCP snooping, the system will inspect or identify a DHCP server and acquire IP address to MAC address bindings.

With Dynamic IP addressing, IP Source Guard depends upon a binding table that is discovered or learned via DHCP snooping. For example, mobile unit 170 authenticates and connects to VLAN 145. Mobile unit 170 acquires an IP address from a DHCP server. Access point 161 learns an IP address to MAC address binding for mobile unit 170. Subsequently, access point 161 passes the IP to MAC address binding information to wireless controller 140. Wireless controller 140 then populates this IP to MAC binding and communicates this binding information to peer wireless controllers in the mobility domain. At this point, when a mobile unit 170 roams to access point 162, access point 162 will receive or acquire the IP to MAC binding from wireless controller 141, which binding was previously learned through DHCP snooping by wireless controller 140. Access point 162 then installs an access control list and corresponding entry, so that access point 162 will pass data traffic from mobile unit 170. With dynamic addressing, it is not necessary to make IP to MAC bindings at a global level, because such binding entries can be acquired automatically through DHCP snooping. Wireless controller 140 can then distribute such acquired binding information to peer wireless controllers through a control messaging protocol.

Functionality supported by the wireless system and, more particularly, functionality associated with wireless controller 140 will now be discussed via flowcharts and illustrations in FIG. 2 through FIG. 7. For purposes of the following discussion, the wireless controller 140 or other appropriate entity performs steps in the flowcharts.

Figure 2:
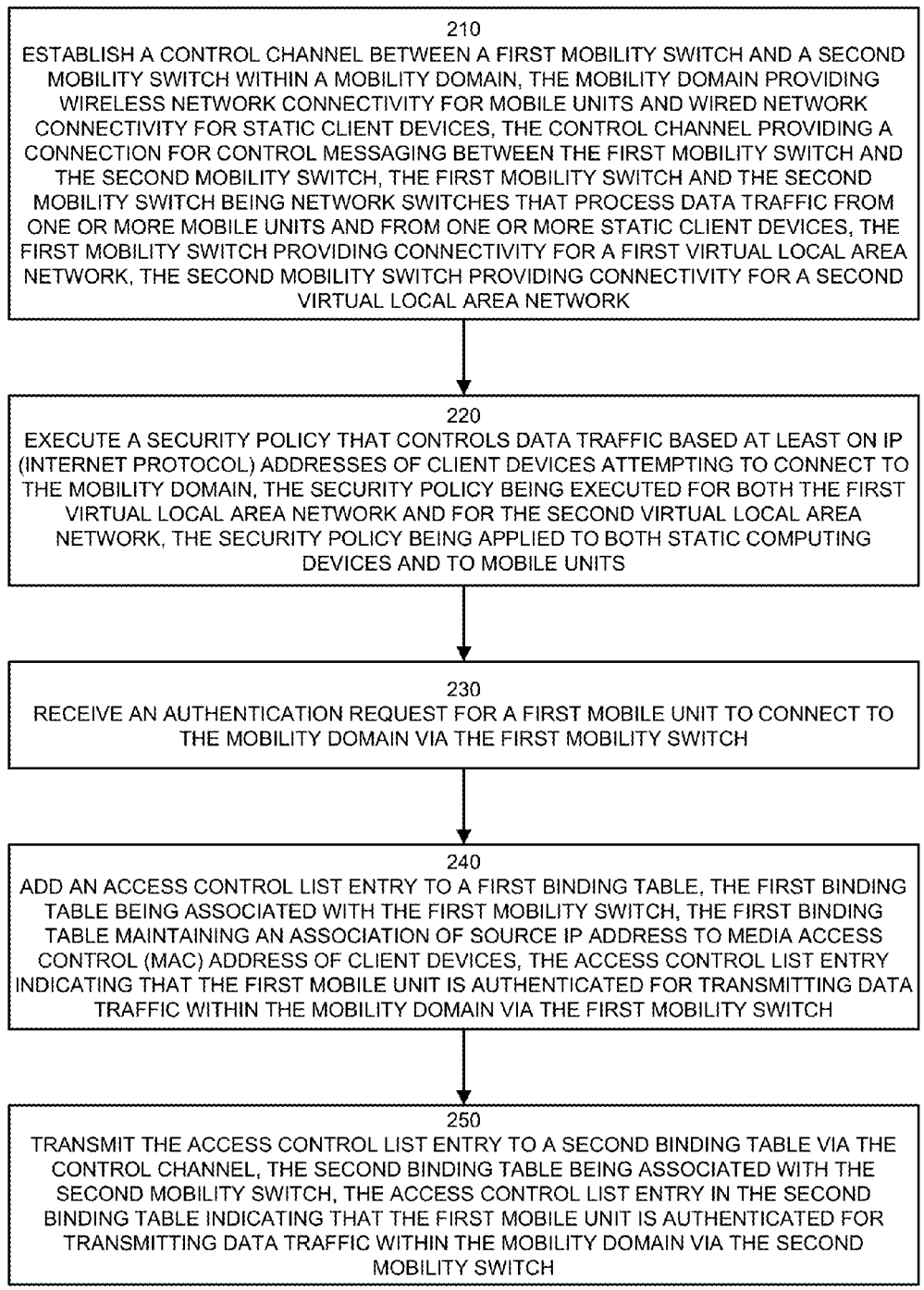
FIG. 2 is a flowchart illustrating an example of a wireless controller process according to embodiments herein.

Now describing embodiments more specifically, FIG. 2 is a flow chart illustrating embodiments disclosed herein. In step 210, wireless controller 140 establishes a control channel between a first mobility switch 151 and a second mobility switch 153 within a mobility domain. The mobility domain provides wireless network connectivity for mobile units and wired network connectivity for static client devices. For example, the mobility domain is operating as a unified network. The control channel provides a connection for control messaging between the first mobility switch 151 and the second mobility switch 153. Such a control channel enables the mobility switches to communicate data to and from each other, such as security information. The first mobility switch 151 and the second mobility switch 153 are network switches that process data traffic from one or more mobile units and from one or more static client devices. For example, there can be various client computer devices with a physical connection to the mobility switch, and there can be a wireless connection interface for wirelessly connecting mobile units either directly, or indirectly such as with a wireless access point device. The first mobility switch provides connectivity for a first virtual local area network 145, and the second mobility switch 153 provides connectivity for a second virtual local area network 146. Thus, the mobility domain can have two or more network divisions. These network divisions to not necessarily need to be VLANs, but can be divided by a mobility switch itself, or cluster of mobility switches, or any other logical or physical division.

In step 220, wireless controller 140 executes a security policy that controls data traffic based at least on IP (internet protocol) addresses of client devices attempting to connect to the mobility domain. The security policy is executed for both the first virtual local area network 145 and for the second virtual local area network 146, with this security policy being applied to both static computing devices and to mobile units. In other words, a same security policy is equally applied to both wireless and wired host computers. This security policy can be any conventional security policy, or custom security policy. In another embodiment, this security policy is applied to different mobility switches within the mobility domain.

In step 230, wireless controller 140 receives an authentication request for a first mobile unit to connect to the mobility domain via the first mobility switch 151. Such a request can be initially received via an access point, hub, or other network connection device, with the request passed through or routed to the first mobility switch 151.

In step 240, wireless controller 140 adds an access control list entry to a first binding table. The first binding table is associated with the first mobility switch 151 in that the first binding table is accessible from the first mobility switch 151. The first binding table maintains an association of source IP addresses to Media Access Control (MAC) address, or other physical device address, of client devices. The access control list entry indicates that the first mobile unit 170 is authenticated for transmitting data traffic within the mobility domain via the first mobility switch 151.

In step 250 wireless controller 140 transmits the access control list entry to a second binding table via the control channel. The second binding table is associated with, or otherwise accessible to, the second mobility switch 153. The access control list entry in the second binding table indicates that the first mobile unit 170 is authenticated for transmitting data traffic within the mobility domain via the second mobility switch 153. In other words, peer mobility switches can advertise, or propagate, known binding entries to peer switches or peer wireless controllers within the mobility domain.

Figure 3:
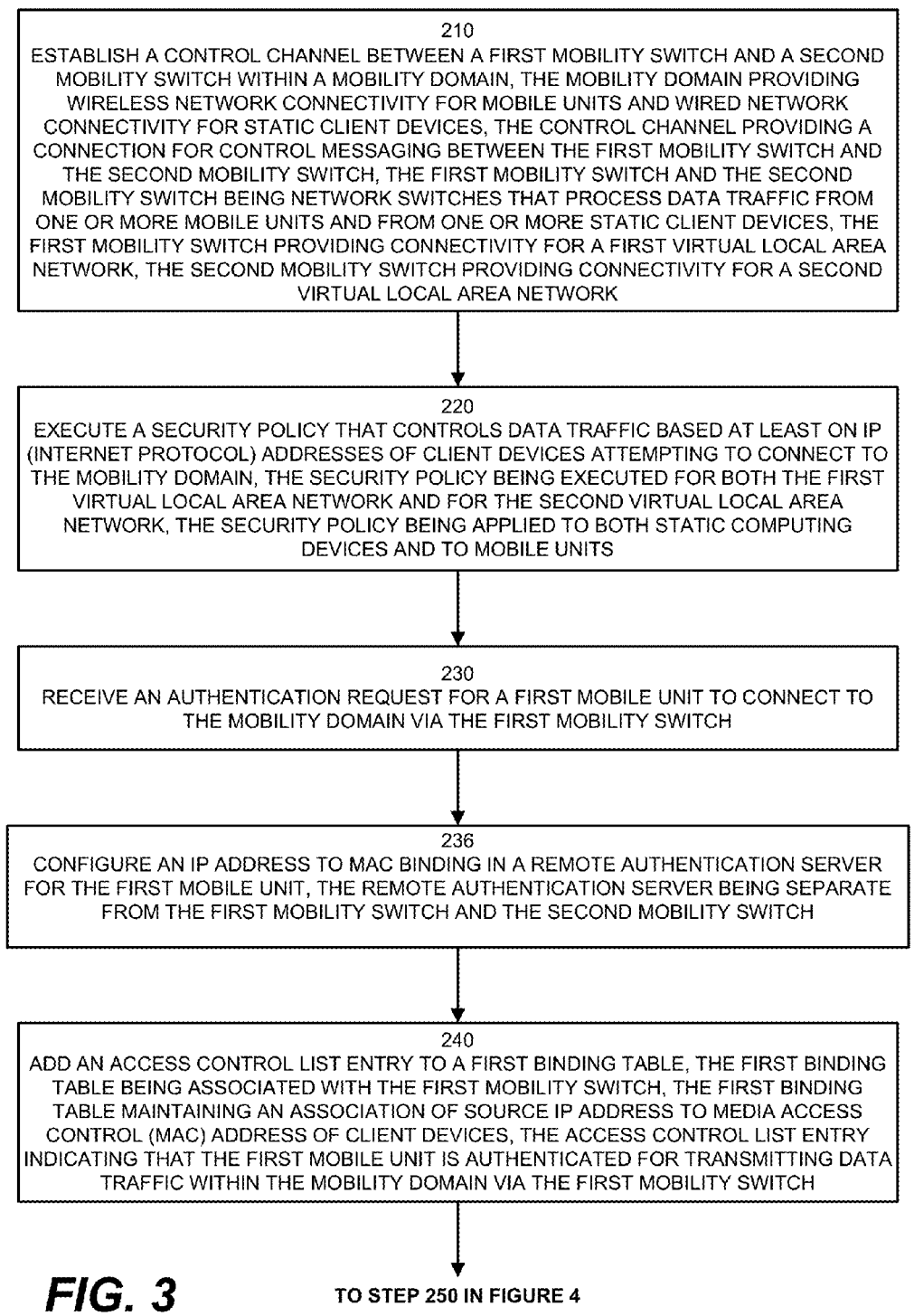
FIGS. 3-5 are a flowchart illustrating an example of a wireless controller process according to embodiments herein.
Figure 4:
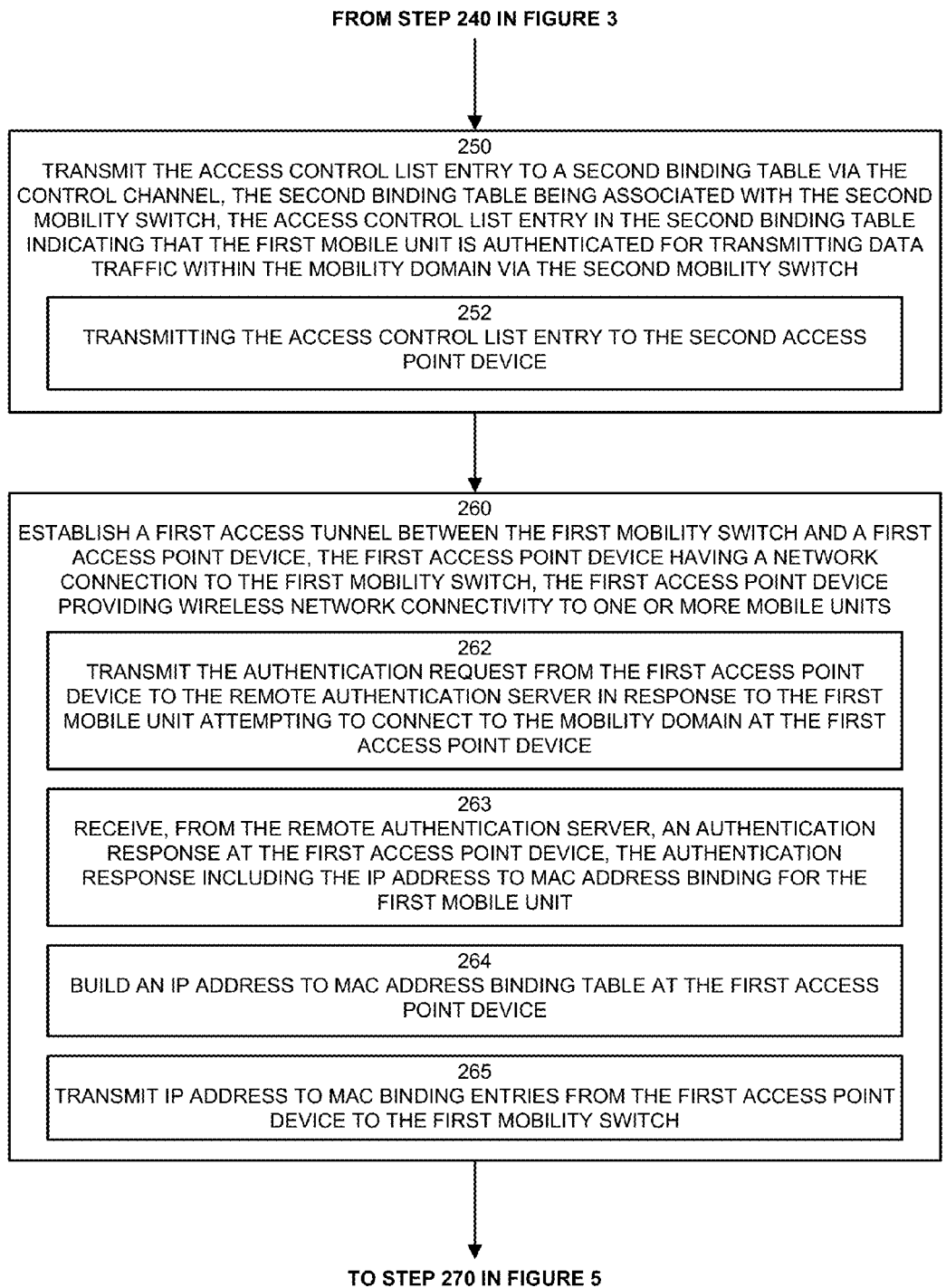
Figure 5:
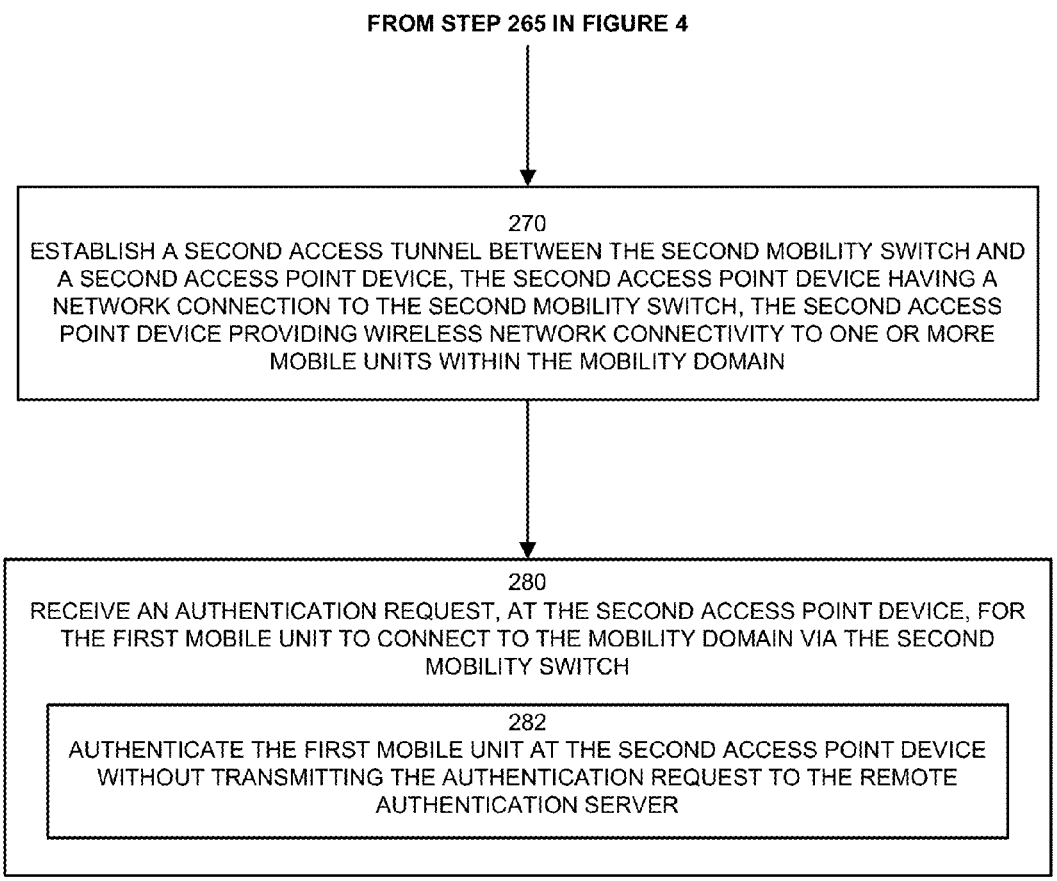

FIGS. 3-5 expand on the flowchart of FIG. 2 by providing additional features and functionality. FIGS. 3-5 include an example embodiment for use with mobile units using a static IP address configuration. In step 210, wireless controller 140 establishes a control channel between a first mobility switch 151 and a second mobility switch 153 within a mobility domain. The mobility domain provides wireless network connectivity for mobile units and wired network connectivity for static client devices. The control channel provides a connection for control messaging between the first mobility switch 151 and the second mobility switch 153. The first mobility switch 151 and the second mobility switch 153 are network switches that process data traffic from one or more mobile units and from one or more static client devices. The first mobility switch provides connectivity for a first virtual local area network 145, and the second mobility switch 153 provides connectivity for a second virtual local area network 146.

In step 220, wireless controller 140 executes a security policy that controls data traffic based at least on IP (internet protocol) addresses of client devices attempting to connect to the mobility domain. The security policy is executed for both the first virtual local area network 145 and for the second virtual local area network 146, with this security policy being applied to both static computing devices and to mobile units.

In step 230, wireless controller 140 receives an authentication request for a first mobile unit 170 to connect to the mobility domain via the first mobility switch 151.

In step 236, wireless controller 140 configures an IP address to MAC binding in a remote authentication server 187 for the first mobile unit. The remote authentication server 187 is separate from the first mobility switch 151 and the second mobility switch 153. For example, the remote authentication server 187 can be a RADIUS server, or other equivalent server accessible from entities within the mobility domain. Such a server can provide centralized authentication.

In step 240, wireless controller 140 adds an access control list entry to a first binding table. The first binding table is associated with the first mobility switch 151 in that the first binding table is accessible from the first mobility switch 151. The access control list entry indicates that the first mobile unit 170 is authenticated for transmitting data traffic within the mobility domain via the first mobility switch 151.

In step 250 wireless controller 140 transmits the access control list entry to a second binding table via the control channel. The second binding table is associated with, or otherwise accessible to, the second mobility switch 153. The access control list entry in the second binding table indicates that the first mobile unit 170 is authenticated for transmitting data traffic within the mobility domain via the second mobility switch 153.

In step 252, wireless controller 140 transmits the access control list entry to the second access point device 162. With a binding table stored locally at access point device 162, and with access point device 162 having cached authentication parameters, a given mobile unit roaming to access point device 162 can very quickly authenticate and continue to transmit data traffic.

In step 260, wireless controller 140 establishes a first access tunnel between the first mobility switch 151 and a first access point device 161. The first access point device 161 has a network connection to the first mobility switch 151. The first access point device 161 provides wireless network connectivity to one or more mobile units.

In step 262, wireless controller 140 transmits the authentication request from the first access point device 161 to the remote authentication server 187 in response to the first mobile unit attempting to connect to the mobility domain at the first access point device 161. Thus, this example embodiment uses centralized authentication.

In step 263, wireless controller 140 receives, from the remote authentication server 187, an authentication response at the first access point device 161. The authentication response includes the IP address to MAC address binding for the first mobile unit 170.

In step 264, wireless controller 140 builds an IP address to MAC address binding table at the first access point device 161.

In step 265, wireless controller 140 transmits IP address to MAC binding entries from the first access point device 161 to the first mobility switch 151. In this way, the control plane can use the binding information to advertise to peer wireless controllers.

In step 270, wireless controller 140 establishes a second access tunnel between the second mobility switch 153 and a second access point device 162. The second access point device 162 has a network connection to the second mobility switch 153. The second access point device 162 provides wireless network connectivity to one or more mobile units within the mobility domain.

In step 280, wireless controller 140 receives an authentication request, at the second access point device 162, for the first mobile unit 170 to connect to the mobility domain via the second mobility switch 153.

In step 282, wireless controller 140 authenticates the first mobile unit 170 at the second access point device 162 without transmitting the authentication request to the remote authentication server 187, thereby enabling seamless connectivity for mobile unit 170.

Figure 6:
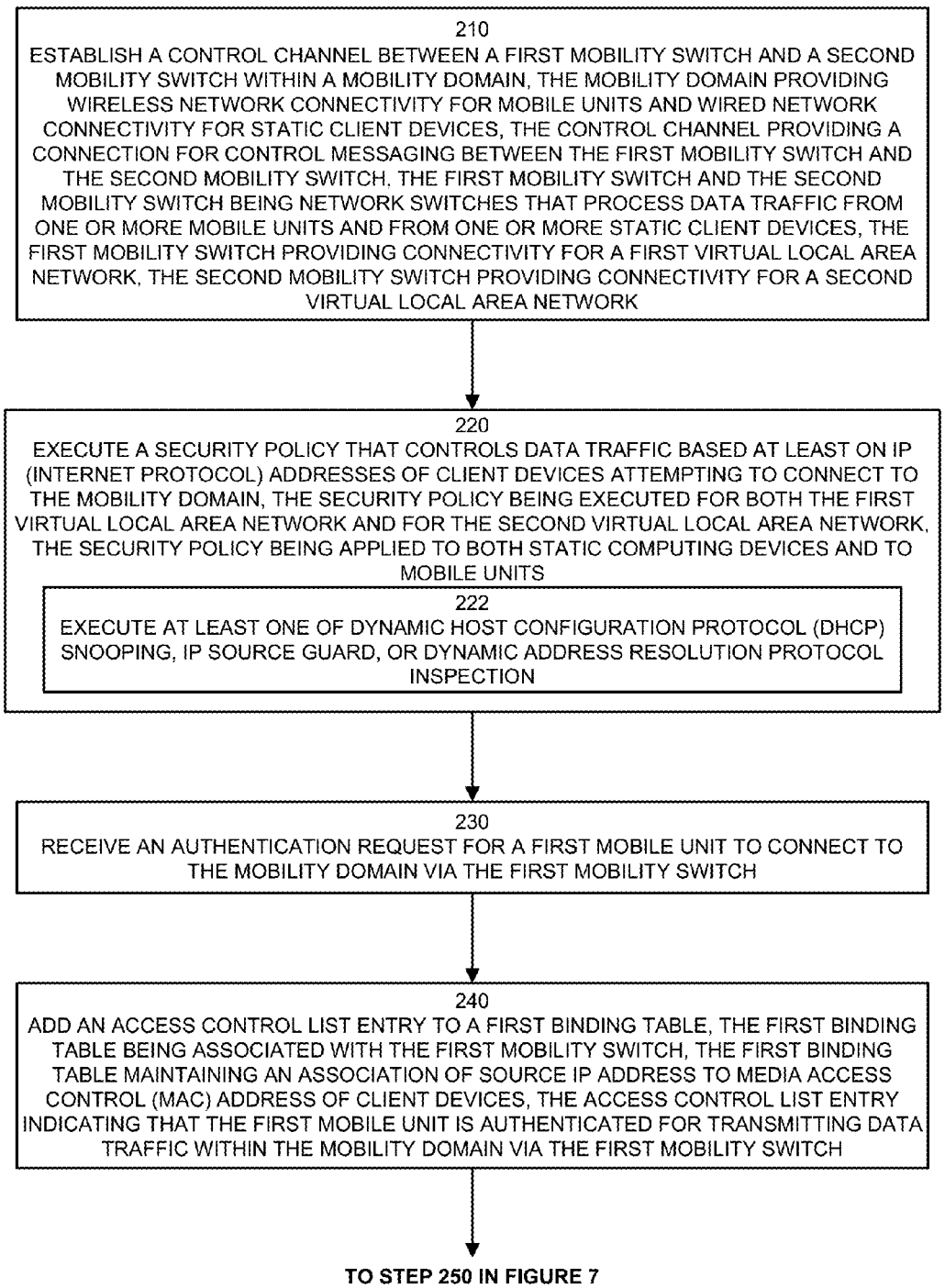
FIGS. 6-7 are a flowchart illustrating an example of a wireless controller process according to embodiments herein.
Figure 7:
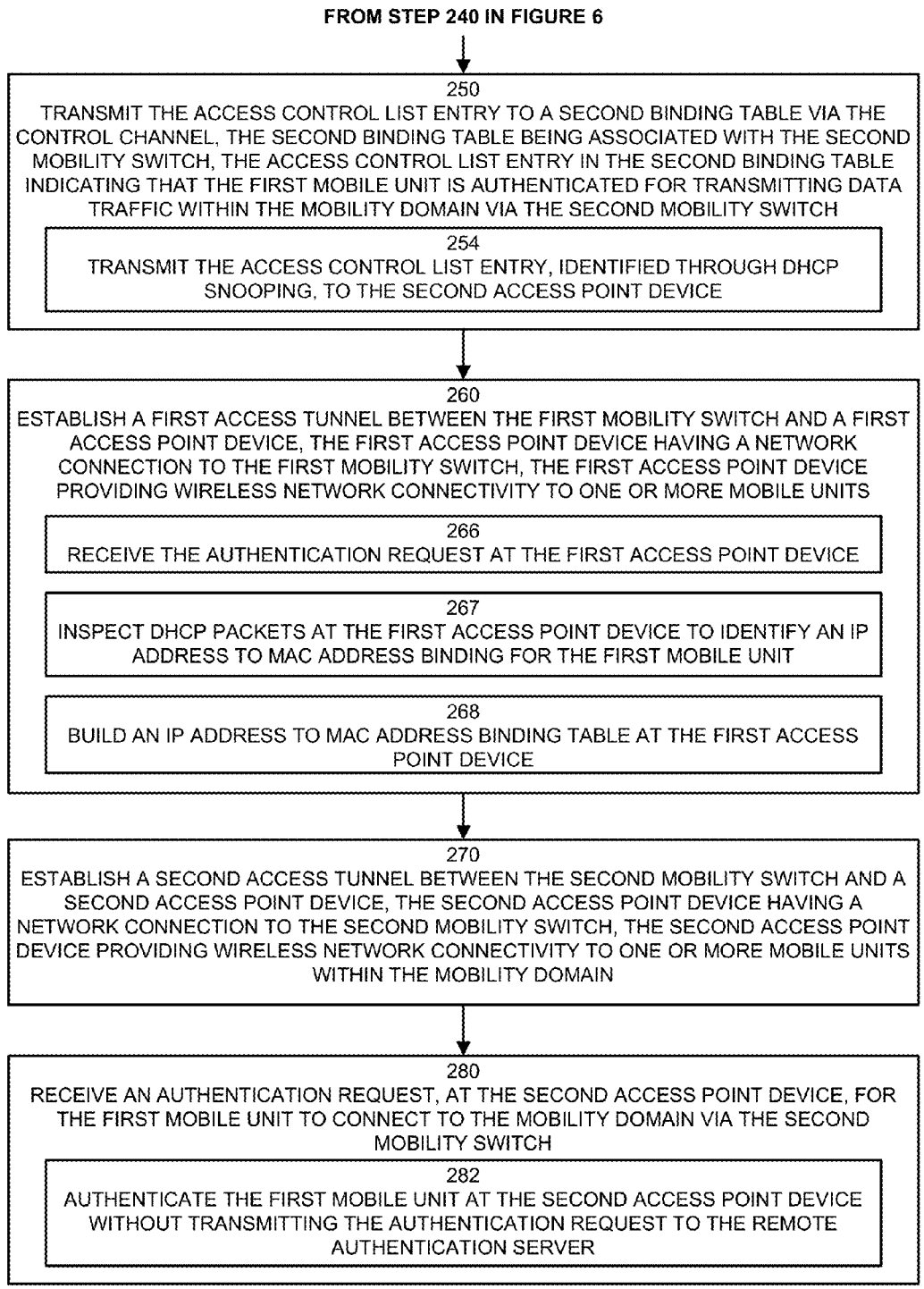

FIGS. 6-7 expand on the flowchart of FIG. 2 by providing additional features and functionality. FIGS. 6-7 include an example embodiment for use with mobile units using a dynamic IP address. In step 210, wireless controller 140 establishes a control channel between a first mobility switch 151 and a second mobility switch 153 within a mobility domain. The mobility domain provides wireless network connectivity for mobile units and wired network connectivity for static client devices. The control channel provides a connection for control messaging between the first mobility switch 151 and the second mobility switch 153. The first mobility switch 151 and the second mobility switch 153 are network switches that process data traffic from one or more mobile units and from one or more static client devices. The first mobility switch provides connectivity for a first virtual local area network 145, and the second mobility switch 153 provides connectivity for a second virtual local area network 146.

In step 220, wireless controller 140 executes a security policy that controls data traffic based at least on IP (internet protocol) addresses of client devices attempting to connect to the mobility domain. The security policy is executed for both the first virtual local area network 145 and for the second virtual local area network 146, with this security policy being applied to both static computing devices and to mobile units.

In step 222, wireless controller 140 executes at least one of Dynamic Host Configuration Protocol (DHCP) Snooping, IP Source Guard, or Dynamic Address Resolution Protocol Inspection. In other words, wireless controller 140 can use at least one of the identified security policies, but can also use any combination or all of these security policies and other security policies.

DHCP Snooping configuration for a wireless network domain can be part of an access point profile configuration. Having such a profile configuration consistent among wireless controllers can make a network unified. A given access point can execute snooping for the wireless mobility domain. A number of entries supported in the binding table can be the same as a number of mobile units associated with the access point. When DHCP is enabled, access and mobility tunnels can be treated as trusted ports so that the access point will not execute snooping on these tunnels. The access point can execute snooping from mobile units, and drop DHCP server related messages from the mobile units.

DAI configuration for wireless network domain can be part of an access point profile configuration. DAI at the access point typically functions with DHCP snooping enabled. An access point acquires the binding information through a RADIUS server, or other authentication server. The authentication server provides the IP to MAC bindings for clients where IP addresses are statically configured. The access point can then convey this binding information to the wireless controller.

The mobility domain supports IP Source Guard for mobile users. Wireless controller 140 receives the binding table for mobile units as does a corresponding access point, such as an access point to which a mobile unit is try to access or attach. Access points can then install a filter to drop frames from mobile units that are not present in the binding table.

In step 230, wireless controller 140 receives an authentication request for a first mobile unit to connect to the mobility domain via the first mobility switch 151.

In step 240, wireless controller 140 adds an access control list entry to a first binding table. The first binding table is associated with the first mobility switch 151 in that the first binding table is accessible from the first mobility switch 151. The access control list entry indicates that the first mobile unit 170 is authenticated for transmitting data traffic within the mobility domain via the first mobility switch 151.

In step 250 wireless controller 140 transmits the access control list entry to a second binding table via the control channel. The second binding table is associated with, or otherwise accessible to, the second mobility switch 153. The access control list entry in the second binding table indicates that the first mobile unit 170 is authenticated for transmitting data traffic within the mobility domain via the second mobility switch 153.

In step 254, wireless controller 140 transmits the access control list entry, identified through DHCP snooping, to the second access point device 162.

In step 260, wireless controller 140 establishes a first access tunnel between the first mobility switch 151 and a first access point device 161. The first access point device 161 has a network connection to the first mobility switch 151. The first access point device 161 provides wireless network connectivity to one or more mobile units.

In step 266, wireless controller 140 receives the authentication request at the first access point device 161.

In step 267, wireless controller 140, or access point device 161, inspects DHCP packets at the first access point device 161 to identify an IP address to MAC address binding for the first mobile unit 170.

In step 268, wireless controller 140 builds an IP address to MAC address binding table at the first access point device.

In step 270, wireless controller 140 establishes a second access tunnel between the second mobility switch 153 and a second access point device 162. The second access point device 162 has a network connection to the second mobility switch 153. The second access point device 162 provides wireless network connectivity to one or more mobile units within the mobility domain.

In step 280, wireless controller 140 receives an authentication request, at the second access point device 162, for the first mobile unit 170 to connect to the mobility domain via the second mobility switch 153.

In step 282, wireless controller 140 authenticates the first mobile unit 170 at the second access point device 162 without transmitting the authentication request to the remote authentication server 187, thereby enabling seamless connectivity for mobile unit 170.

The system provides for several alternative embodiments and architectures. Control planes can be portable for supporting multiple device configurations. Certain embodiments can use a two-tier architecture where a control path and data path are collocated in a same box or device. Other embodiments use multi-tier architecture to provide a data path with minimal control plane interface for configuration and events, and a control path located in a different device. Control paths can support multiple forwarding architectures including centralized core forwarding, centralized edge forwarding, and distributed forwarding.

Wireless controllers can create dynamic VLANs at switches where a specific VLAN is not available. For example, if mobile unit 170 was assigned as a member of VLAN 145, which mobility switch 153 does not act as a VLAN server, then mobility switch 153 can create a temporary VLAN at mobility switch 153 while mobile unit 170 is connected via mobility switch 153.

Figure 8:
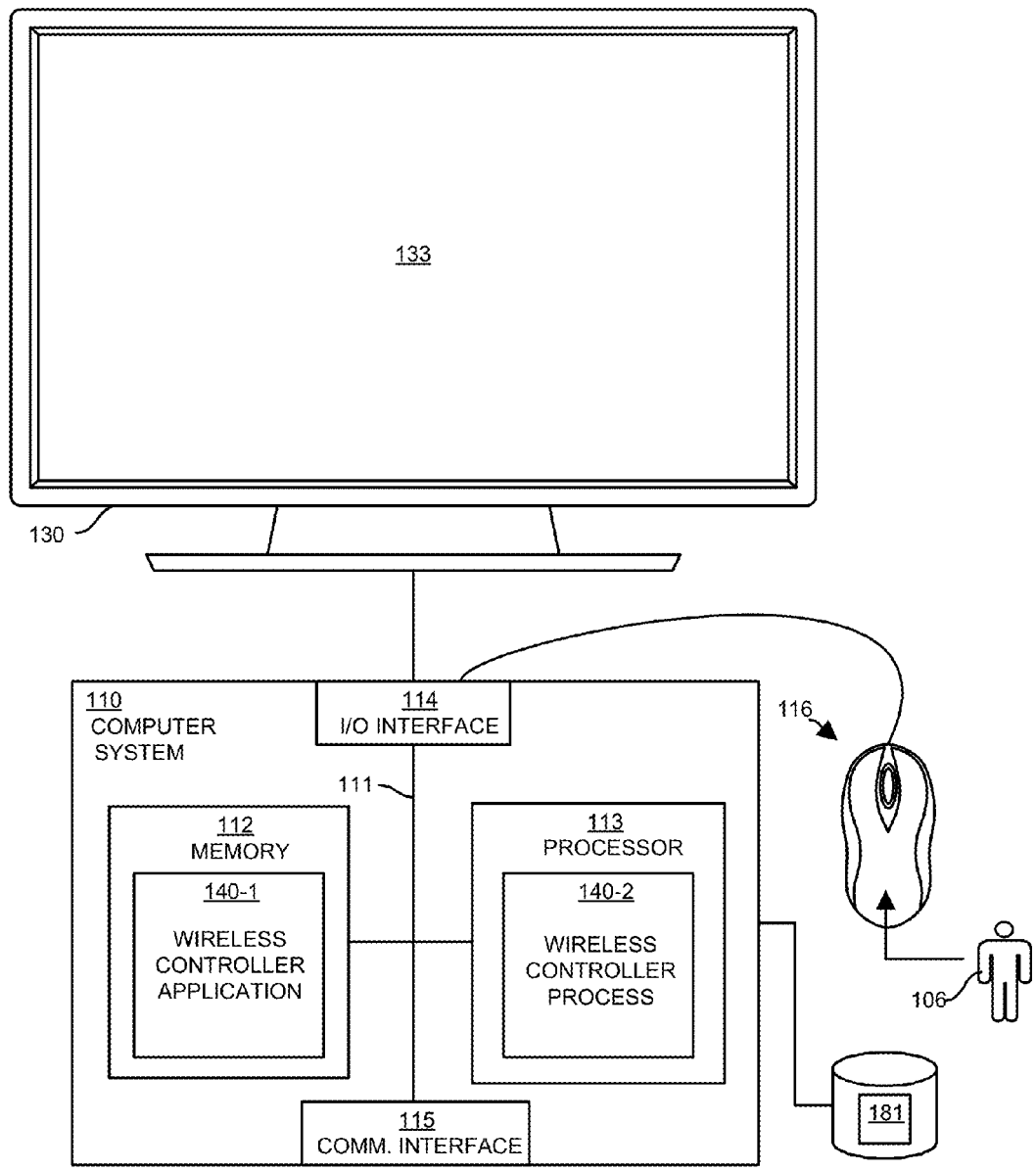
FIG. 8 is an example block diagram of a wireless controller operating in a computer/network environment according to embodiments herein.

FIG. 8 shows an example physical embodiment according to techniques disclosed herein. In FIG. 8, computer system 110 is shown connected to display monitor 130 for displaying a graphical user interface 133 for a user 106 to use a wireless controller 140 for processing data using input devices 116. In some embodiments, computer system 110 can execute wireless controller 140 independent of user input, or in response to various inputs. Repository 181 can optionally be used for storing client data both before and after processing. Input devices 116 can include one or more devices such as a keyboard, computer mouse, etc.

Note that the following discussion provides a basic embodiment indicating how to carry out functionality associated with the wireless controller 140 as discussed above and below. It should be noted, however, that the actual configuration for carrying out the wireless controller 140 can vary depending on a respective application. For example, as previously discussed, computer system 110 can include one or multiple computers that carry out the processing as described herein.

In different embodiments, computer system 110 may be any of various types of devices, including, but not limited to, a network switch, a router, a wireless access point, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the wireless controller 140 of computer system 110 to communicate over a network and, if necessary, retrieve any data required to create views, process content, communicate with a user, etc. according to embodiments herein.

As shown, memory system 112 is encoded with wireless controller 140-1 that supports functionality as discussed above and as discussed further below. Wireless controller 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the wireless controller 140-1. Execution of the wireless controller 140-1 produces processing functionality in wireless controller process 140-2. In other words, the wireless controller process 140-2 represents one or more portions of the wireless controller 140 performing within or upon the processor 113 in the computer system 110.

It should be noted that, in addition to the wireless controller process 140-2 that carries out method operations as discussed herein, other embodiments herein include the wireless controller 140-1 itself (i.e., the un-executed or non-performing logic instructions and/or data). The wireless controller 140-1 may be stored on a tangible computer readable storage medium including computer readable storage media such as floppy disk, hard disk, optical medium, etc. According to other embodiments, the wireless controller 140-1 can also be stored in a memory type system such as in firmware, read only memory (ROM), or, as in this example, as executable code within the memory system 112.

In addition to these embodiments, it should also be noted that other embodiments herein include the execution of the wireless controller 140-1 in processor 113 as the wireless controller process 140-2. Thus, those skilled in the art will understand that the computer system 110 can include other processes and/or software and hardware components, such as an operating system that controls allocation and use of hardware resources, or multiple processors.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
 establishing a control channel between a first mobility switch and a second mobility switch within a mobility domain, the mobility domain providing wireless network connectivity for mobile units and wired network connectivity for static client devices, the control channel providing a connection for control messaging between the first mobility switch and the second mobility switch, the first mobility switch and the second mobility switch being network switches that process data traffic from one or more mobile units and from one or more static client devices, the first mobility switch providing connectivity for a first virtual local area network, the second mobility switch providing connectivity for a second virtual local area network;

executing a security policy that controls data traffic based at least on IP (Internet Protocol) addresses of client devices attempting to connect to the mobility domain, the security policy being executed for both the first virtual local area network and for the second virtual local area network, the security policy being applied equally to both static computing devices and to mobile units;

receiving an authentication request for a first mobile unit to connect to the mobility domain via the first mobility switch;

adding an access control list entry to a first binding table, the first binding table being associated with the first mobility switch, the first binding table maintaining an association of source IP address to Media Access Control (MAC) address of client devices, the access control list entry indicating that the first mobile unit is authenticated for transmitting data traffic within the mobility domain via the first mobility switch;

transmitting the access control list entry to a second binding table via the control channel, the second binding table being associated with the second mobility switch, the access control list entry in the second binding table indicating that the first mobile unit is authenticated for transmitting data traffic within the mobility domain via the second mobility switch;

establishing a first access tunnel between the first mobility switch and a first access point device, the first access point device having a network connection to the first mobility switch, the first access point device providing wireless network connectivity to one or more mobile units; and establishing a second access tunnel between the second mobility switch and a second access point device, the second access point device having a network connection to the second mobility switch, the second access point device providing wireless network connectivity to one or more mobile units within the mobility domain.

2. The computer-implemented method of claim 1, further comprising:

configuring an IP address to MAC binding in a remote authentication server for the first mobile unit, the remote authentication server being separate from the first mobility switch and the second mobility switch; and wherein receiving the authentication request for the first mobile unit to connect to the mobility domain via the first mobility switch includes transmitting the authentication request from the first access point device to the remote authentication server in response to the first mobile unit attempting to connect to the mobility domain at the first access point device.

3. The computer-implemented method of claim 2, further comprising:

receiving, from the remote authentication server, an authentication response at the first access point device, the authentication response including the IP address to MAC address binding for the first mobile unit;

building an IP address to MAC address binding table at the first access point device; and transmitting IP address to MAC binding entries from the first access point device to the first mobility switch.

4. The computer-implemented method of claim 3, further comprising:

wherein transmitting the access control list entry to the second binding table via the control channel includes transmitting the access control list entry to the second access point device;

receiving an authentication request, at the second access point device, for the first mobile unit to connect to the mobility domain via the second mobility switch; and in response to receiving the authentication request at the second access point device, authenticating the first mobile unit at the second access point device without transmitting the authentication request to the remote authentication server.

5. The computer-implemented method of claim 3, wherein executing the security policy that controls data traffic based at least on IP addresses includes executing at least IP Source Guard.

6. The computer-implemented method of claim 1, wherein executing the security policy that controls data traffic based at least on IP addresses includes executing at least Dynamic Host Configuration Protocol (DHCP) snooping, IP Source Guard, and Dynamic Address Resolution Protocol Inspection.

7. The computer-implemented method of claim 6, further comprising:

wherein receiving the authentication request for a first mobile unit to connect to the mobility domain via the first mobility switch includes receiving the authentication request at the first access point device;

in response to receiving the authentication request, inspecting DHCP packets at the first access point device to identify an IP address to MAC address binding for the first mobile unit; and building an IP address to MAC address binding table at the first access Point device.

8. The computer-implemented method of claim 7, further comprising:

wherein transmitting the access control list entry to the second binding table via the control channel includes transmitting the access control list entry, identified through DHCP snooping, to the second access point device;

receiving an authentication request, at the second access point device, for the first mobile unit to connect to the mobility domain via the second mobility switch; and in response to receiving the authentication request at the second access point device, authenticating the first mobile unit at the second access point device without transmitting the authentication request to the remote authentication server.

9. A computer system comprising:

a memory;

a processor;

a communications interface;

an interconnection mechanism coupling the memory, the processor and the communications interface, the memory storing instructions that when executed by the processor cause the system to perform the operations of:

establishing a control channel between a first mobility switch and a second mobility switch within a mobility domain, the mobility domain providing wireless network connectivity for mobile units and wired network connectivity for static client devices, the control channel providing a connection for control messaging between the first mobility switch and the second mobility switch, the first mobility switch and the second mobility switch being network switches that process data traffic from one or more mobile units and from one or more static client devices, the first mobility switch providing connectivity for a first division of the mobility domain, the second mobility switch providing connectivity for a second division of the mobility domain;

executing a security policy that controls data traffic based at least on IP (Internet Protocol) addresses of client devices attempting to connect to the mobility domain, the security policy being executed for both the first division of the mobility domain and for the second division of the mobility domain, the security policy being applied equally to both static computing devices and to mobile units;

receiving an authentication request for a first mobile unit to connect to the mobility domain via the first mobility switch;

adding an access control list entry to a first binding table, the first binding table being associated with the first mobility switch, the first binding table maintaining an association of source IP address to Media Access Control (MAC) address of client devices, the access control list entry indicating that the first mobile unit is authenticated for transmitting data traffic within the mobility domain via the first mobility switch;

transmitting the access control list entry to a second binding table via the control channel, the second binding table being associated with the second mobility switch, the access control list entry in the second binding table indicating that the first mobile unit is authenticated for transmitting data traffic within the mobility domain via the second mobility switch;

establishing a first access tunnel between the first mobility switch and a first access point device, the first access point device having a network connection to the first mobility switch, the first access point device providing wireless network connectivity to one or more mobile units; and establishing a second access tunnel between the second mobility switch and a second access point device, the second access point device having a network connection to the second mobility switch, the second access point device providing wireless network connectivity to one or more mobile units within the mobility domain.

10. The computer system of claim 9, wherein the memory stores further instructions that when executed by the processor cause the system to perform the operations of:
configuring an IP address to MAC binding in a remote authentication server for the first mobile unit, the remote authentication server being separate from the first mobility switch and the second mobility switch; and
wherein receiving the authentication request for the first mobile unit to connect to the mobility domain via the first mobility switch includes transmitting the authentication request from the first access point device to the remote authentication server in response to the first mobile unit attempting to connect to the mobility domain at the first access point device.

11. The computer system of claim 10, wherein the memory stores further instructions that when executed by the processor cause the system to perform the operations of:
receiving, from the remote authentication server, an authentication response at the first access point device, the authentication response including the IP address to MAC address binding for the first mobile unit;
building an IP address to MAC address binding table at the first access Point device; and
transmitting IP address to MAC binding entries from the first access point Device to the first mobility switch.

12. The computer system of claim 11, wherein the memory stores further instructions that when executed by the processor cause the system to perform the operations of:
wherein transmitting the access control list entry to the second binding table via the control channel includes transmitting the access control list entry to the second access point device;
receiving an authentication request, at the second access point device, for the first mobile unit to connect to the mobility domain via the second mobility switch; and
in response to receiving the authentication request at the second access point device, authenticating the first mobile unit at the second access point device without transmitting the authentication request to the remote authentication server.

13. The computer system of claim 11, wherein executing the security policy that controls data traffic based at least on IP addresses includes executing at least IP Source Guard.

14. The computer system of claim 9, wherein executing the security policy that controls data traffic based at least on IP addresses includes executing at least Dynamic Host Configuration Protocol (DHCP) snooping, IP Source Guard, and Dynamic Address Resolution Protocol Inspection.

15. The computer system of claim 14, wherein the memory stores Further instructions that when executed by the processor cause the system to Perform the operations of:
wherein receiving the authentication requested for a first mobile unit to connect to the mobility domain via the first mobility switch includes receiving the authentication requests at the first access point device;
in response to receiving the authentication request, inspecting DHCP packets at the first access point device to identify an IP address to MAC address binding for the first mobile unit; and
building an IP address to MAC address binding table at the first access point device.

16. The computer system of claim 15, wherein the memory stores further instructions that when executed by the processor cause the system to perform the operations of:
wherein transmitting the access control list entry to the second binding table via the control channel includes transmitting the access control list entry, identified through DHCP snooping, to the second access point device;
receiving an authentication request, at the second access point device, for the first mobile unit to connect to the mobility domain via the second mobility switch; and
in response to receiving the authentication request at the second access point device, authenticating the first mobile unit at the second access point device without transmitting the authentication request to the remote authentication server.

17. A non-transitory computer-storage medium having instructions stored thereon for processing data information, such that the instructions, when carried out by a processing device, cause the processing device to perform the operations of:
establishing a control channel between a first mobility switch and a second mobility switch within a mobility domain, the mobility domain providing wireless network connectivity for mobile units and wired network connectivity for static client devices, the control channel providing a connection for control messaging between the first mobility switch and the second mobility switch, the first mobility switch and the second mobility switch being network switches that process data traffic from one or more mobile units and from one or more static client devices, the first mobility switch providing connectivity for a first virtual local area network, the second mobility switch providing connectivity for a second virtual local area network;

executing a security policy that controls data traffic based at least on IP (Internet Protocol) addresses of client devices attempting to connect to the mobility domain, the security policy being executed for both the first virtual local area network and for the second virtual local area network, the security policy being applied equally to both static computing devices and to mobile units;

receiving an authentication request for a first mobile unit to connect to the mobility domain via the first mobility switch;

adding an access control list entry to a first binding table, the first binding table being associated with the first mobility switch, the first binding table maintaining an association of source IP address to Media Access Control (MAC) address of client devices, the access control list entry indicating that the first mobile unit is authenticated for transmitting data traffic within the mobility domain via the first mobility switch;

transmitting the access control list entry to a second binding table via the control channel, the second binding table being associated with the second mobility switch, the access control list entry in the second binding table indicating that the first mobile unit is authenticated for transmitting data traffic within the mobility domain via the second mobility switch;

establishing a first access tunnel between the first mobility switch and a first access point device, the first access point device having a network connection to the first mobility switch, the first access point device providing wireless network connectivity to one or more mobile units;

establishing a second access tunnel between the second mobility switch and a second access point device, the second access point device having a network connection to the second mobility switch, the second access point device providing wireless network connectivity to one or more mobile units within the mobility domain; and wherein executing the security policy that controls data traffic based at least on IP addresses includes executing at least Dynamic Host Configuration Protocol (DHCP) snooping, IP Source Guard, and Dynamic Address Resolution Protocol Inspection.

* * * * *